US011285983B1

(12) United States Patent
Horowitz

(10) Patent No.: US 11,285,983 B1
(45) Date of Patent: Mar. 29, 2022

(54) WAGON HAVING ARTICLE TRANSPORT CARRIAGES

(71) Applicant: Brian Horowitz, Lake Forest, CA (US)

(72) Inventor: Brian Horowitz, Lake Forest, CA (US)

(*) Notice: Subject to any disclaimer, the term of this patent is extended or adjusted under 35 U.S.C. 154(b) by 0 days.

(21) Appl. No.: 17/100,418

(22) Filed: Nov. 20, 2020

(51) Int. Cl.
*B62B 3/04* (2006.01)
*B62B 3/00* (2006.01)
*B62B 5/06* (2006.01)

(52) U.S. Cl.
CPC .............. *B62B 3/007* (2013.01); *B62B 3/003* (2013.01); *B62B 3/04* (2013.01); *B62B 5/064* (2013.01); *B62B 2203/02* (2013.01)

(58) Field of Classification Search
CPC ......... B62B 3/007; B62B 3/003; B62B 3/002; B62B 3/005; B62B 3/04; B62B 3/025; B62B 5/064; B62B 2203/02
See application file for complete search history.

(56) References Cited

U.S. PATENT DOCUMENTS

| | | | |
|---|---|---|---|
| 4,805,935 A * | 2/1989 | Grayson | B62B 3/144 |
| | | | 280/33.992 |
| 9,145,154 B1 * | 9/2015 | Horowitz | B62B 7/008 |
| 9,623,890 B1 * | 4/2017 | Horowitz | B62B 3/005 |
| 10,106,186 B2 * | 10/2018 | Choi | B62B 3/02 |
| 10,435,055 B1 * | 10/2019 | Zhu | B62B 7/08 |
| 10,457,310 B2 * | 10/2019 | Sturgeon | B62B 3/106 |
| 2002/0140190 A1 * | 10/2002 | Shapiro | B62B 3/02 |
| | | | 280/39 |
| 2019/0322301 A1 * | 10/2019 | Hull | B62B 3/007 |

* cited by examiner

*Primary Examiner* — John D Walters
(74) *Attorney, Agent, or Firm* — Morland C. Fischer

(57) ABSTRACT

A wagon is disclosed having a basket by which to carry a first article, a basket support rack on which the basket sits, a first carriage connected to the wagon below the basket by which to carry a second article, and a second carriage connected to the wagon behind the basket by which to carry a third article. The first carriage includes a pair of brackets, each of which having first and second C-shaped bracket arms being pivotally connected to and depending downwardly from one side of the basket support rack. The C-shaped bracket arms are arranged in spaced facing alignment to carry the second article therebetween. The second carriage includes a flat platform having a pair of engagement hooks extending therefrom. The engagement hooks of the platform are detachably connected in surrounding engagement with respective platform retainer clips that are connected to the rear of the basket support rack.

17 Claims, 7 Drawing Sheets

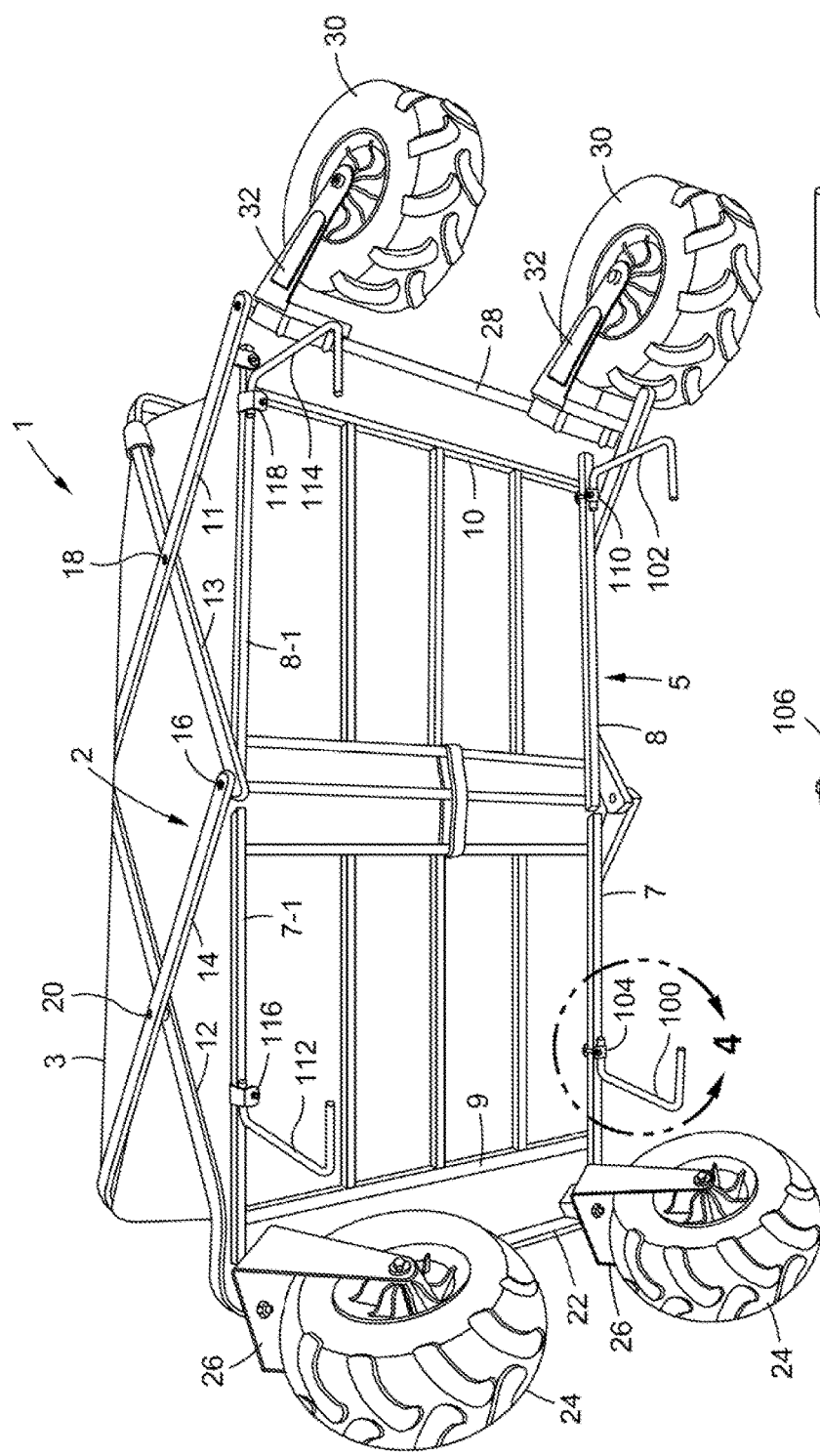
FIG. 3
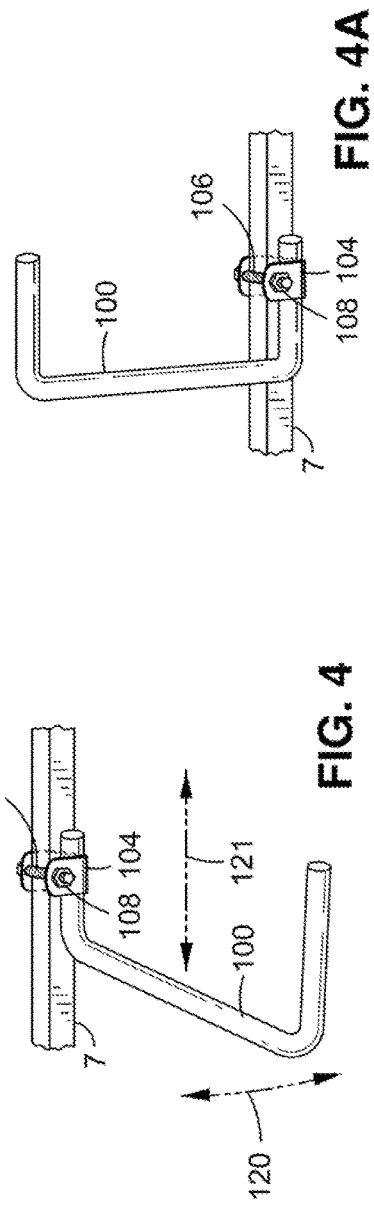
FIG. 4
FIG. 4A

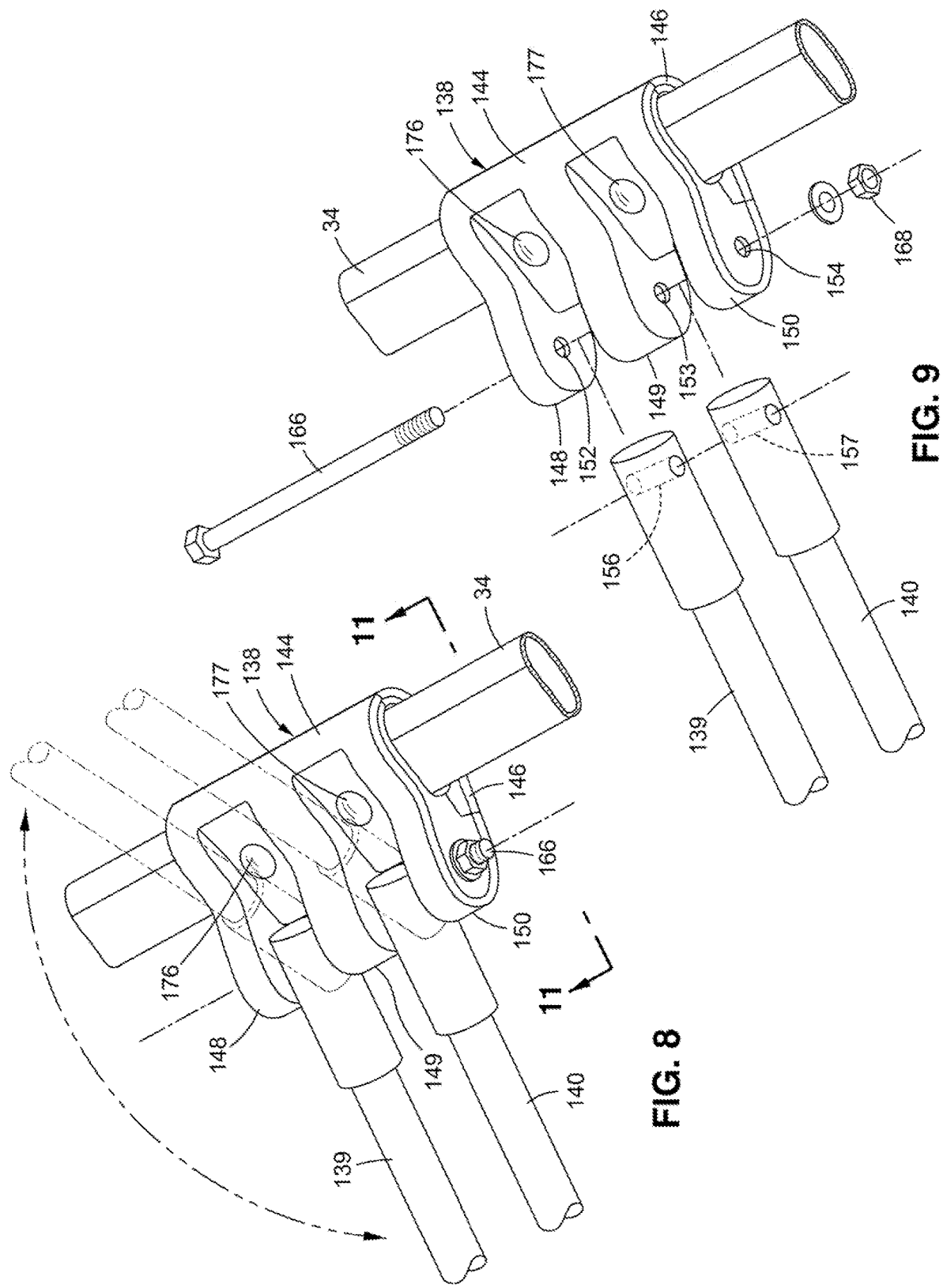

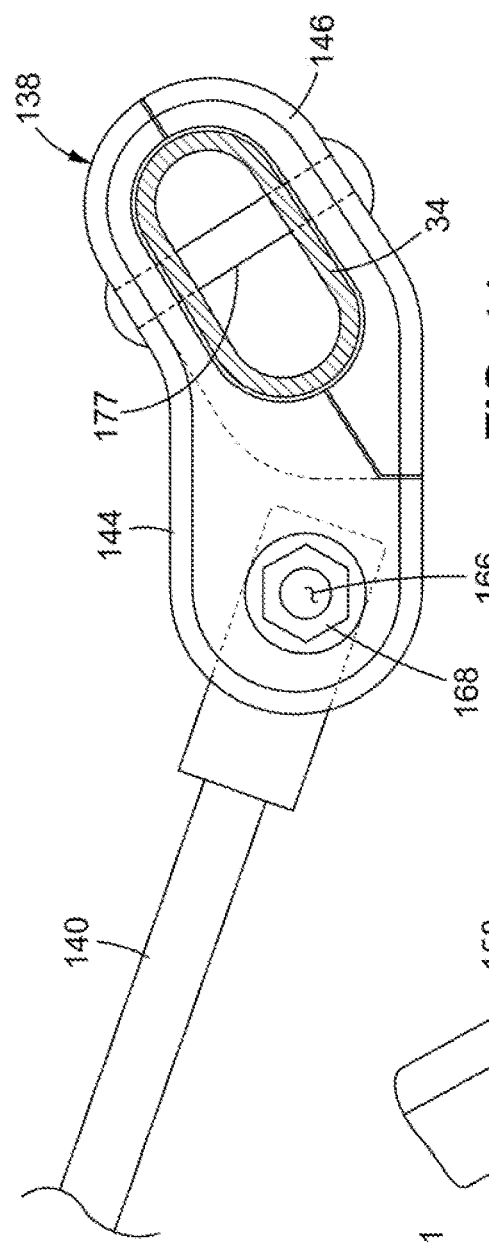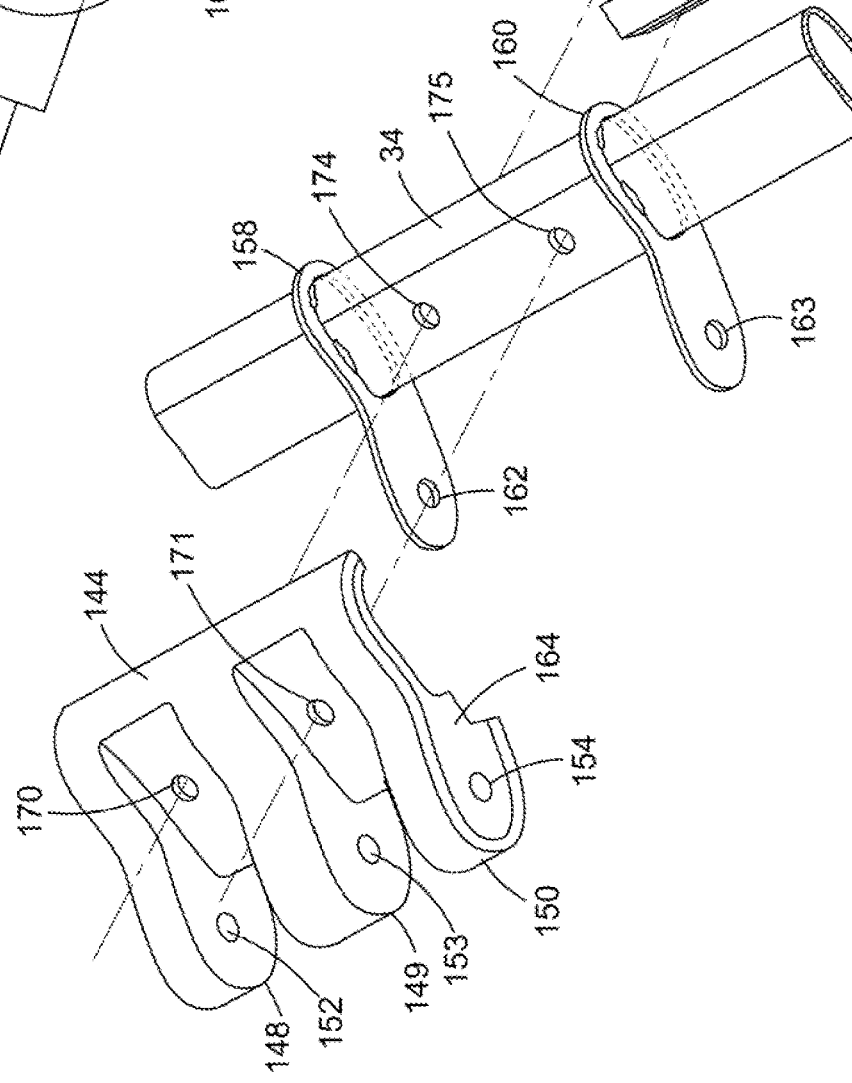

WAGON HAVING ARTICLE TRANSPORT CARRIAGES

BACKGROUND OF THE INVENTION

1. Field of the Invention

This invention relates to a wagon having a basket within which to carry a variety of articles and/or small children. To expand the capacity of the wagon to be able to transport additional articles that are sometimes too large to fit inside the basket, a first carriage is attached below the basket and underneath the basket support rack of the wagon on which the basket is seated, and a second carriage is attached to the rear of the wagon behind the basket and the basket support rack.

2. Background Art

Non-motorized wagons have long been used to be pulled by an individual by means of a handle so that articles loaded into a basket of the wagon can be transported from place-to-place. However, the basket has a limited capacity which may require the user to make more than a single trip to be able to transport his entire load. In some cases, an article to be transported may be too large to fit inside the wagon basket which may necessitate the assistance of a second individual. By way of example, if the individual is using the wagon to transport articles for an outdoor picnic, a picnic table around which participants will be seated and a cooler in which to carry food and refreshments can often be larger than the wagon basket.

Accordingly, it would be desirable to be able to modify a conventional wagon in order for it to transport articles, in addition to those carried in the usual wagon basket, that are too large to fit inside the basket.

SUMMARY OF THE INVENTION

In general terms, disclosed herein is a wagon which includes a flexible basket. The wagon transports a variety of articles and/or children that are loaded into the basket. The wagon also includes a frame and a basket support rack on which the basket is seated and above which the basket is held up by the frame. In one embodiment, the frame and the basket support rack are adapted to be folded so that the wagon is correspondingly folded from an expanded open configuration during use to a compact collapsed configuration to facilitate transport and/or storage of the wagon when it is not in use. In another embodiment, the frame and the basket support rack are not adapted to be folded so that the wagon remains in its expanded open configuration. The wagon includes pairs of front and rear wheels that are attached by wheel brackets to front and rear wheel support tracks of the wagon frame to roll over a surface in response to a pulling or a pushing force being applied to a wagon transport handle. The wagon transport handle is pivotally connected to the wagon at the front of the frame so as to be rotatable through an angle of greater than 180 degrees from a position located outside the basket to an out of the way position located inside the basket.

To expand the capacity of the wagon to transport articles in addition to those being transported in the usual wagon basket, including articles that are too large to fit in the wagon basket, a first carriage is connected to the bottom of the wagon to lie below the basket and underneath the basket support rack. The first carriage includes first and second brackets that are connected to respective rails at opposite sides of the basket support rack. Each of the first and second brackets of the first carriage has a pair of C-shaped bracket arms that are attached to and depend downwardly from one of the side rails of the basket support rack so as to be held in spaced facing alignment with one another. The pairs of C-shaped bracket arms of the first and second brackets are pivotally attached to the side rails by couplers, such that the bracket arms are rotatable upwardly at the couplers from their downwardly depending position so as to lie at an unobtrusive position flush against the bottom of the basket support rack. With the pairs of C-shaped bracket arms rotated to their downwardly depending position, a table, or the like, can be transported by the first carriage below the bottom of the wagon.

To further expand the capacity of the wagon to transport articles, a second carriage is connected to the wagon to lie behind the basket and the basket support rack. The second carriage includes a removable flat platform having a pair of attachment hooks projecting therefrom. The attachment hooks are detachably connected to the rear of the wagon so that the platform extends outwardly therefrom to lie above and past the rear wheels. In particular, the attachment hooks are moved into surrounding engagement with respective platform retainer clips that are connected to the rear of the basket support rack. The platform lays on top of the rear wheel brackets which connect the rear wheels to the rear wheel support track of the wagon frame so that the outwardly extending platform is supported and held up by the rear wheel brackets above the rear wheels. With the platform connected to the wagon, a cooler, or the like, can be laid on and transported by the second carriage at the rear of the wagon.

BRIEF DESCRIPTION OF THE DRAWINGS

FIG. 3 is a bottom perspective view of the wagon of FIG. 1 showing the first carriage connected to the bottom of the wagon;

FIG. 4 shows an enlarged detail taken from FIG. 3 showing a C-shaped bracket arm of the first carriage depending downwardly from the bottom of the wagon;

FIG. 4A shows the bracket arm of the first carriage of FIG. 4 rotated upwardly so as to lie against the bottom of the wagon;

FIG. 8 is an enlarged detail taken from FIG. 1 showing a wagon transport handle pivotally connected to the front of the wagon;

FIG. 9 is an exploded view showing handle bars of the wagon transport handle of FIG. 8 to be coupled to the front of the wagon;

FIG. 10 is an exploded view showing a cover for the wagon transport handle to be coupled to the front of the wagon; and FIG. 11 is a cross-section taken along lines 11-11 of FIG. 10 showing the handle bars of the wagon transport handle pivotally connected to the front of the wagon.

DESCRIPTION OF THE PREFERRED EMBODIMENT

Figure 1:
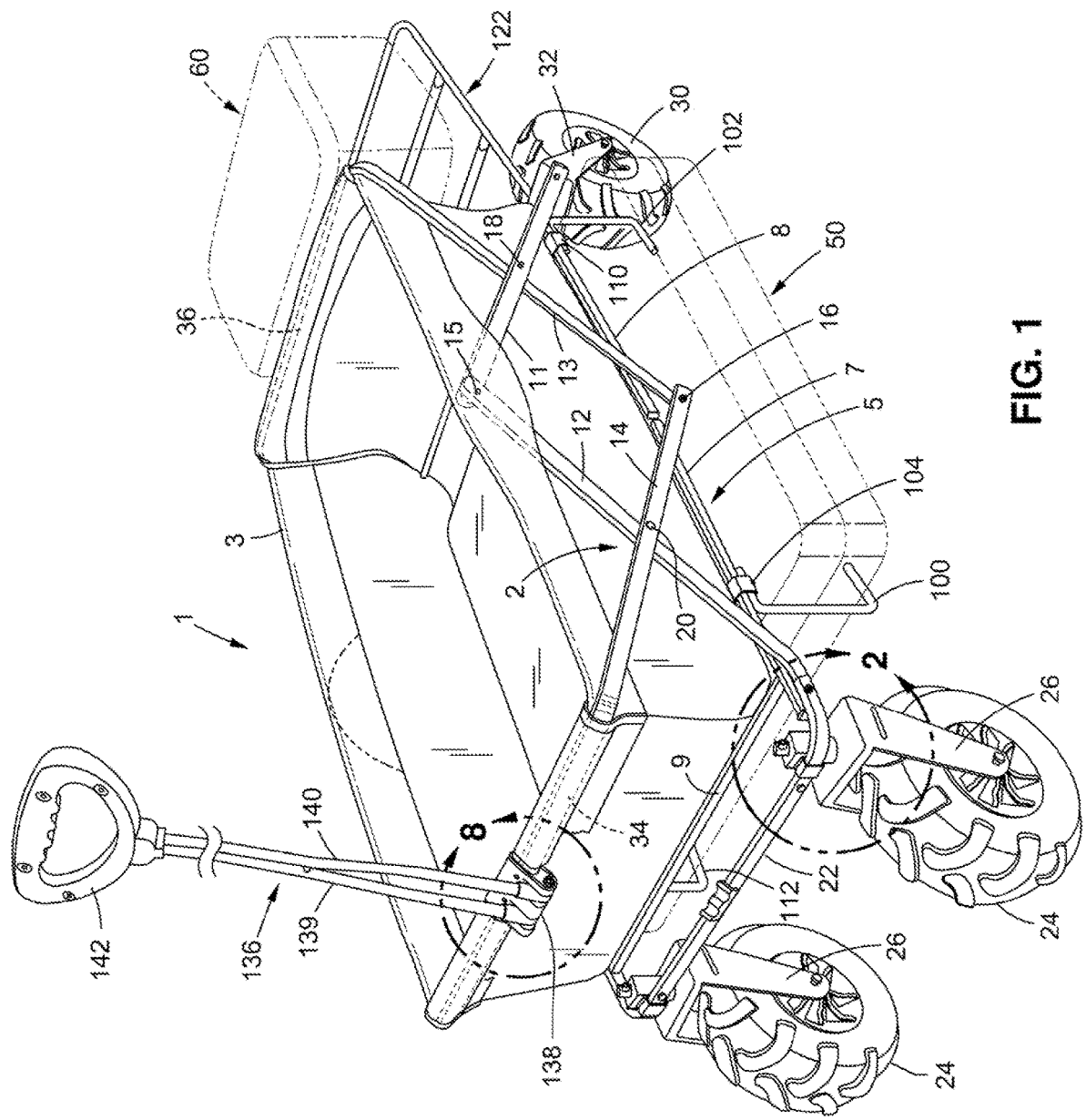
FIG. 1 is a top perspective view of a wagon having a basket in which to transport articles and first and second carriages attached to the wagon by which to transport additional articles.

Referring initially to FIGS. 1 and 3 of the drawings, there is shown a wagon 1 that, in a first embodiment of this invention, is adapted to be folded between an expanded open configuration during use and a compact folded configuration (not shown) at which to facilitate the wagon's transport or storage when it is not in use. A folding wagon 1, such as that referred to immediately above, can be found by referring to U.S. Pat. No. 9,145,154 issued Sep. 29, 2015 and pending patent application Ser. No. 16/043,819 filed Jul. 24, 2018. Therefore, the common features of the wagon 1 herein disclosed and the folding wagons disclosed in the aforementioned patent and patent application are incorporated herein by reference, and only a brief description thereof will be provided.

The wagon 1 according to the first embodiment has a frame 2 that carries a fabric basket 3 within which to transport a variety of articles including, but not limited to, sporting and camping goods, picnic supplies, business inventory and small children. The fabric basket 3 is open at the top and closed along the bottom, front, rear and sides. The basket 3 sits upon and stands upwardly from a flat basket support rack 5 that lies at the bottom of the wagon 1. The basket 3 is held above the rack 5 by the wagon frame 2. The basket support rack 5 has pairs of adjacent side rails 7, 8 and 7-1, 8-1 located at opposite sides thereof. Each pair of side rails is pivotally connected end-to-end so as to be capable of being rotated upwardly and towards one another so as to lie face-to-face in response to an uplifting pulling force applied thereto when the wagon is to be folded to its compact collapsed configuration. End rails 9 and 10 lie at the front and rear of the basket support rack 5 and extend laterally across the rack between the side rails 7, 8 and 7-1, 8-1.

It is to be expressly understood that the advantages of this invention that will soon be described are also applicable to wagons that do not fold. According to another embodiment of this invention, the basket support rack 5 remains flat such that the side rails 7, 8 and 7-1, 8-1 thereof do not rotate towards one another. Likewise, each pair of side rails may be replaced by a single side rail (not shown) that runs between the front and rear end rails 9 and 10 of the support rack 5. Thus, the wagon 1 will at all times stay in its expanded open configuration as shown in FIGS. 1 and 3. Whether the wagon 1 is foldable or not, the frame 2 holds the basket 3 up so as to be seated on and stand above the basket support rack 5. Reference may be made to the aforementioned U.S. Pat. No. 9,145,154 for details to explain the attachment of the basket 3 to the wagon frame 2 so that the basket 3 is held above the basket support rack 5.

Briefly, however, each side of the frame 2 of a wagon that folds lies adjacent a corresponding side of the wagon basket 3 and includes a first pair of diagonally extending side support arms 11 and 12 and a second pair of diagonally extending side support arms 13 and 14. The first pair of diagonal side support arms 11 and 12 are connected to one another at first ends thereof by means of an upper pivot coupling 15, so that the support arms 11 and 12 project upwardly to make an angle of about 90 degrees. The second pair of diagonal side support arms 13 and 14 are connected to one another at first ends thereof by means of a lower pivot coupling 16, so that the support arms 13 and 14 project downwardly to also make an angle of about 90 degrees. The diagonally extending side support arms 11 and 13 are coupled to one another about midway between the first and opposite ends thereof by means of a first intermediate pivot coupling 18, and the diagonally extending side support arms 12 and 14 are coupled to one another about midway between the first and opposite ends thereof by means of a second intermediate pivot coupling 20.

The opposite end of the side support arm 12 of the first pair of side support arms 11 and 12 of the wagon frame 2 is connected to one end of a first wheel support track 22 that bends around the front of wagon 1. The front wheel support track 22 is spaced ahead of the front rail 9 of the basket support rack 5. A pair of front wheels 24 of the wagon 1 are connected to respective U-shaped front wheel brackets 26, and the front wheel brackets are pivotally connected to the front wheel support track 22.

The opposite end of the side support arm 11 of the first of the pair of side support arms 11 and 12 of the wagon frame 2 is connected to a rear wheel support track 28 that extends across the rear of wagon 1 (best shown in FIG. 3). The rear wheel support track 28 is spaced behind the rear rail 10 of the basket support rack 5. A pair of rear wheels 30 of the wagon 1 are connected to respective U-shaped rear wheel brackets 32, and the rear wheel brackets are pivotally connected to the rear wheel support track 28.

A horizontal extension 34 of the side support arm 14 of the second pair of side support arms 13 and 14 of the wagon frame 2 bends continuously around and runs across the front of the wagon 1. The front of the wagon basket 3 is folded over and around the extension 34 of the side support arm 12 to help hold the basket 3 up so that the basket 3 will sit on and stand above the basket support rack 5 when the wagon 1 is in its expanded open configuration.

Likewise, a horizontal extension 36 of the side support arm 13 of the second pair of side support arms 13 and 14 of the wagon frame 2 bends continuously around and runs across the rear of the wagon 1. The rear of the wagon basket 3 is folded over and around the extension 36 of the side support arm 13 to help hold the basket 3 up so that it will sit on and stand above the basket support rack 5 when the wagon is in its expanded open configuration.

Figure 2:
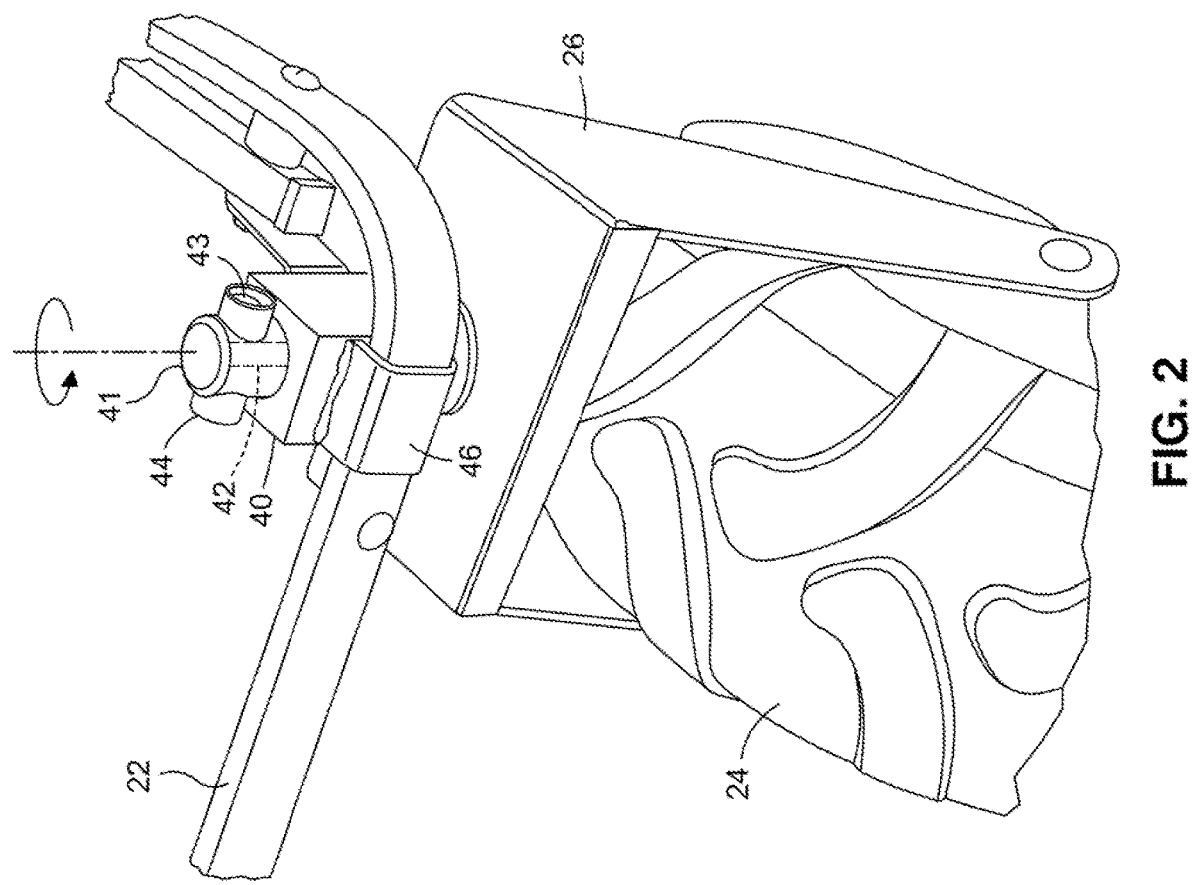
FIG. 2 shows an enlarged detail of the wagon taken from FIG. 1.

A detail of the wagon 1 of FIG. 1 is shown in FIG. 2 of the drawings. In particular, each of the U-shaped front wheel brackets 26 of the wagon 1 is rotatable relative to the front wheel support track 22 by means of a wheel shaft housing 40. A lock cap 41 is mounted on top of and rotatable relative to the wheel shaft housing 40. A shaft 42 extends downwardly from the lock cap 41, longitudinally through the wheel shaft housing 40, to the front wheel bracket 26 to which the housing 40 is welded. A fastener 43 runs through a sleeve 44 to connect the top of the shaft 42 to the lock cap 41 so that the lock cap 41 and the shaft 42 rotate together. The wheel shaft housing 40 is affixed to the front wheel support track 22 by a wheel bracket support brace 46 that surrounds track 22 and is welded to housing 40. Each front wheel 24 of the wagon is rotatable with its respective front wheel bracket 26, the shaft 42 and the lock cap 41 when the wagon moves back and forth and the front wheels turn. With the wheel shaft housing 40 affixed to the front wheel support track 22 by the wheel bracket support brace 46, the front wheel bracket 26 will be unable to move in a linear direction towards the front wheel support track 22 so as to advantageously reduce the likelihood that the front wheel bracket 26 could break off from the housing 40 during heavy loading of the wagon.

One improvement to the wagon 1 is now described while referring to FIGS. 1, 3 and 4 of the drawings. In particular, a first carriage is disclosed having first and second brackets by which to enable the wagon 1 to transport an article below the basket 3 and underneath the basket support rack 5, especially articles that are too large to fit into the basket. By way of example only, the article that is shown in FIG. 1 being transported by the first carriage underneath the basket support rack 5 is a conventional folding table 50 that has been folded in half to facilitate its transport. In this example, if the basket 3 of the wagon 1 is used to transport smaller articles for an outdoor picnic, the table 50 is removed from the first carriage underneath the basket support rack 5 and unfolded at the picnic site so that some or all of the articles being carried within the basket can be laid on the table.

In a preferred embodiment, a first of the brackets of the first carriage includes a pair of generally C-shaped bracket arms 100 and 102. The pair of bracket arms 100 and 102 of the first bracket are pivotally and slidably coupled to respective ones of the side rails 7 and 8 that run along one side of the basket support rack 5 above which the basket 3 is standing. As is best shown in FIG. 4, a generally U-shaped coupler 104 surrounds the top of one of the pair of C-shaped bracket arms (e.g., 100). The coupler 104 is connected in surrounding engagement with the side rail 7 at a first side of the basket support rack 5. A first fastener (e.g., a threaded screw) 106 is pushed through the coupler 104, and a complementary fastener (e.g., a nut) 108 is then releasably tightened against the first fastener 106. With the first and complementary fasteners 106 and 108 connected to one another, the C-shaped bracket arm 100 is held against the bottom of the side rail 7 so as to depend downwardly from and be pivotally coupled to the side rail below a first end of the basket support rack 5.

In a like manner, the second of the pair of C-shaped bracket arms 102 of the first bracket is held against and pivotally coupled to the adjacent side rail 8 by an identical U-shaped coupler 110 so as to depend downwardly from side rail 8 and lie below the opposite end of the basket support rack 5. As is best shown in FIG. 3, when the pair of C-shaped bracket arms 100 and 102 of the first bracket of the first carriage are attached to the first and adjacent side rails 7 and 8 as just described, the bracket arms are held in spaced alignment facing one another below the bracket support rack 5.

FIG. 3 also shows the second of the brackets of the first carriage including a pair of generally C-shaped bracket arms 112 and 114 that are pivotally and slidably coupled by respective U-shaped couplers 116 and 118 to and held against the bottom of the adjacent side rails 7-1 and 8-1 that run along the opposite side of the bracket support rack 5. As in the case of the bracket arms 100 and 102 of the first bracket, the pair of C-shaped bracket arms 112 and 114 of the second bracket are held in spaced alignment from one another so as to depend downwardly from and lie below respective ones of the adjacent side rails 7-1 and 8-1 that run along the opposite side of the bracket support rack 5.

FIG. 3 shows the pairs of opposite facing C-shaped bracket arms 100, 102 and 112, 114 of the first and second brackets of the first carriage having a vertical position hanging downwardly from respective ones of the couplers 104, 110, 116 and 118 so that an article, such as that designated 50 in FIG. 1, can be carried between the pairs of bracket arms underneath the basket support rack 5 without consuming any of the storage space within the wagon basket 3. However, the downwardly depending vertical position of the pairs of bracket arms 100, 102 and 112, 114 shown in FIG. 3 can be changed when no article is being carried underneath the bracket support rack 5.

In this case, and as is best shown in FIG. 4A, each downwardly depending bracket arm (e.g., 100) is rotated through an angle of 90 degrees at its coupler (e.g., 104) in the direction of the reference arrow 120 of FIG. 4. The pairs of bracket arms 100, 102 and 112, 114 are thusly rotated upwardly to a horizontal position at which they lay flat against the bottom of the basket support rack 5. It may be appreciated that following their rotation, the bracket arms of the first and second brackets will be repositioned to an unobtrusive location underneath the basket support rack 5 until they are needed once again to transport an article in the manner described above.

Not only are the C-shaped bracket arms 100, 102, 112 and 114 of the first carriage rotatable with respect to the bottom of the basket support rack 5 as just described when no articles are being carried below the rack, but the pairs of bracket arms 100, 102 and 112, 114 of the first and second brackets are slidable along the basket support rack 5 to be capable of carrying articles of different size. More particularly, by loosening the connection of the first and complementary fasteners 106 and 108 of each coupler (e.g., 104 in FIG. 4) which holds a C-shaped bracket arm (e.g., 100) in place, the position of the bracket arm 100 and its coupler 104 can be changed. That is, the coupler 104 is slidable back and forth along the side rail (e.g., 7) to which it is attached in the direction of the reference arrow 121 of FIG. 4 so as to correspondingly change the position of the bracket arm 100 towards or away from its opposing bracket arm 102 (of FIG. 3).

In a like manner, the coupler 110 which holds the C-shaped bracket arm 102 in place is slidable back and forth along the adjacent side rail 8 of the basket support rack 5 to which it is attached so as to correspondingly change the position of the bracket arm 102 towards or away from the bracket arm 100. Once the pair of opposing bracket arms 100 and 102 of the first bracket have been repositioned along their respective side rails 7 and 8 at one side of the basket support rack 5 depending upon the size of the article to be carried, the first and complementary fasteners (e.g., 106 and 108 of FIG. 4) are once again tightened together to hold the couplers 104 and 110 and the pair of C-shaped bracket arms 100 and 102 coupled thereto in place at the bottom of the basket support rack 5.

The couplers 116 and 118 (of FIG. 3) which hold the pair of C-shaped bracket arms 112 and 114 against the bottom and opposite side of the basket support rack 5 can also be loosened so as to be slidable back and forth along the adjacent side rails 7-1 and 8-1 to which they are attached. Accordingly, the positions of the pair of bracket arms 112 and 114 of the second bracket are correspondingly changed towards or away from one another to match the distance between the pair of bracket arms 100 and 102.

Another improvement to the wagon 1 is described while referring to FIGS. 1 and 5-7 of the drawings. In particular, a second carriage is disclosed to be detachably connected to the rear of the wagon 1 behind the basket 3 so that articles can be transported instead of or in addition to the article (designated 50 in FIG. 1) that is transported by the first carriage lying underneath the basket support rack 5, as was disclosed while previously referring to FIGS. 1, 3 and 4. In a preferred embodiment, the second carriage of the wagon 1 is a platform 122. By way of example only, the article to be carried by the platform 122 of the second carriage at the rear of the wagon 1 is a cooler (designated 60 in FIG. 1) in which food and/or refreshments are commonly carried.

The detachable platform 122 of the second carriage is preferably flat with a generally U-shaped frame 124 extending around the periphery thereof. One or more support bars 126 extend laterally across the frame 124 upon which the article 60 to be transported will be seated. A pair of attachment hooks 128 extend outwardly from opposite ends of the U-shaped frame 124. A platform spacing bar 130 (best shown in FIG. 5) extends laterally across the front of the platform 122 so as to lie below the frame 124. A pair of spacer blocks 132 are connected (e.g., welded) between each end of the frame 124 and the platform spacing bar 130. The spacer blocks 132 hold the platform spacing bar 130 below the frame 124 of the platform 122 for a purpose that will soon be explained.

Figures 5, 6:
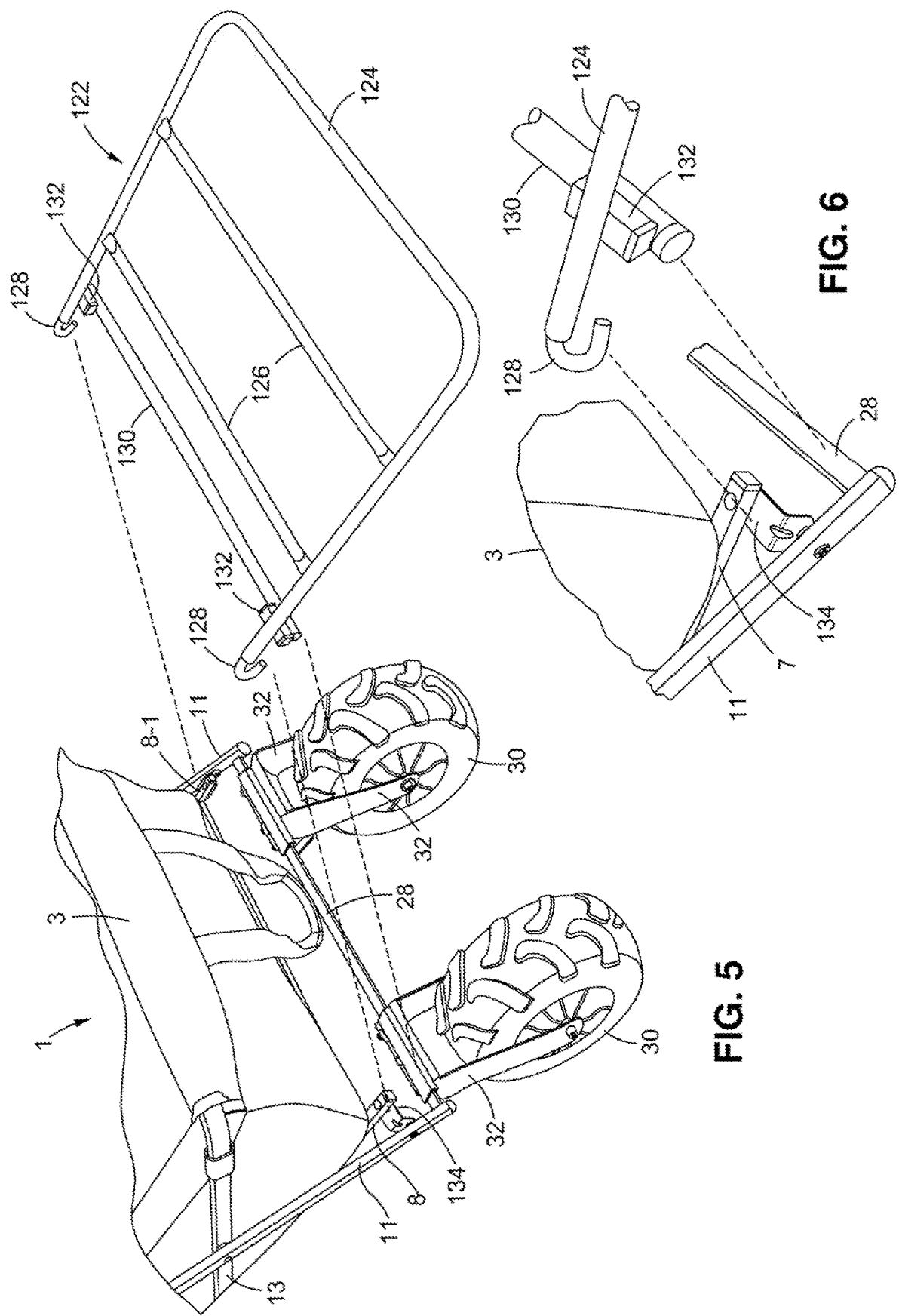
FIG. 5 is an exploded view showing the second carriage to be detachably connected to the rear of the wagon.
FIG. 6 illustrates the detachable connection of the second carriage to the rear of the wagon.
Figure 7:
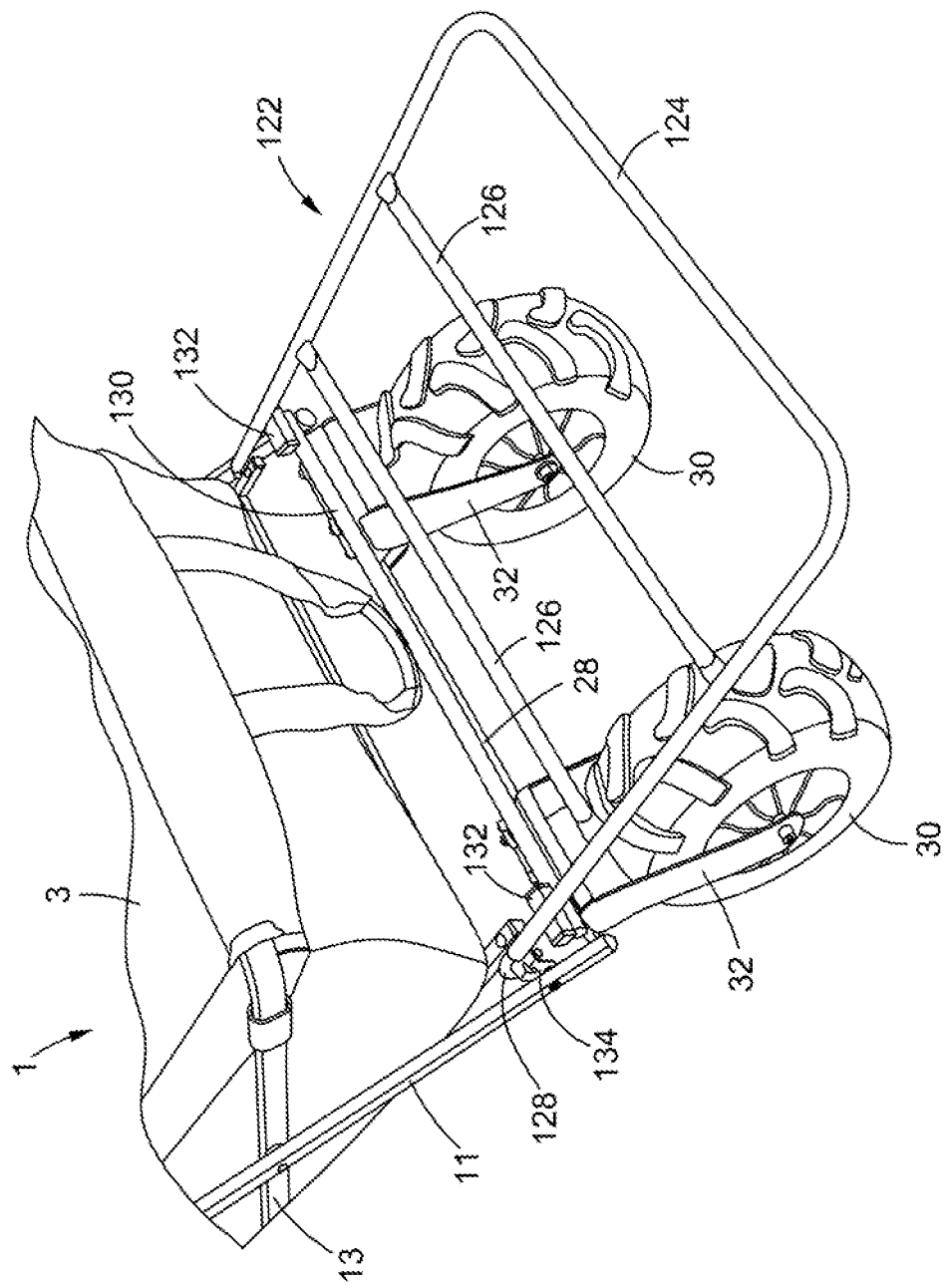
FIG. 7 shows a flat platform of the second carriage connected to the rear of the wagon.

The attachment of the platform 122 of the second carriage to the rear of the wagon 1 behind the basket 3 is shown in FIGS. 5-7. The platform 122 is detachably connected to the wagon 1 by moving the attachment hooks 128 extending from the opposite ends of the platform frame 124 into surrounding engagement with a pair of platform retainer clips 134 that are connected between the side rails 8 and 8-1 of the basket support rack 5 and respective ones of the side support arms 11 that are located at opposite sides of the wagon frame 2.

As is best shown in FIG. 7, with the attachment hooks 128 surrounding the pair of platform retainer clips 134, the platform 122 extends rearwardly from the wagon 1 to lie above and past the rear wheels 30. To this end, the platform spacing bar 130 that runs across the front of the platform 122 below the frame 124 thereof lays on top of the rear wheel support track 28 and the rear wheel brackets 32 to which the rear wheels 30 of the wagon 1 are pivotally connected. The rear wheel support track 28 and the rear wheel brackets 32 connected to track 28 hold the rearwardly extending platform 122 up and prevent the platform from dropping down onto the rear wheels 30 of the wagon 1 in response to the weight of the article 60 that is seated on the platform. When no articles are being transported on the platform 122, it may be detached and easily removed from the rear of the wagon by simply unhooking the attachment hooks 128 from the platform retainer clips 134.

FIG. 1 shows a wagon transport handle 136 pivotally connected by way of a handle mount 138 to the front of the wagon 1. A pulling or a pushing force that is applied to the handle 136 causes the pairs of front and rear wheels 24 and 30 to roll over a surface by which the wagon 1 can be transported from place-to-place in a forward or a backward direction. Details of the wagon transport handle 136 will now be described while referring to FIGS. 1 and 8-11 of the drawings.

As is best shown in FIG. 1, the wagon transport handle 136 includes a pair of handle bars 139 and 140 that run generally side-by-side one another between a grip 142 at the top of the handle and the handle mount 138. As is best shown in FIG. 10 the handle mount 138 includes top and bottom covers 144 and 146 that are configured to be connected one above the other in surrounding engagement with the horizontal extension 34 that runs laterally across the front of the wagon frame 2 so as to hold the wagon basket 3 above the basket support rack 5. Each of the top and bottom covers 144 and 146 of the handle mount 138 is manufactured from a durable material such as plastic or the like.

The top cover 144 of handle mount 138 has three raised fingers 148-150 that are spaced apart with axially aligned holes 152-154 running transversely therethrough. The first of the pair of handle bars 139 is located in the space between the first and second fingers 148 and 149, and the second handle bar 140 is located in the space between the second and third fingers 149 and 150. Each of the handle bars 139 and 140 has a coupling hole 156 and 157 (best shown in FIG. 9) running through the bottom thereof that lies opposite the grip 142. A pair of side braces 158 and 160 (best shown in FIG. 10) of the handle mount 138 are disposed in surrounding engagement with the horizontal extension 34 at the front of the wagon frame 2. Each side brace 158 and 160 has a coupling hole 162 and 163 extending therethrouugh. The side braces 158 and 160 are configured to be received in respective side pockets (only one of which 164 being shown in FIG. 10) that are formed in the outside of each of the first and third fingers 148 and 150 of the top cover 144 of handle mount 138.

With the coupling holes 156 and 157 of the handle bars 139 and 140 axially aligned with the holes 152-154 that run through the raised fingers 148-150 and the coupling holes 162 and 163 that run through the side braces 158 and 160, a coupling connector (e.g., a threaded bolt) 166 is pushed through the series of axially aligned holes, whereby the pair of handle bars 139 and 140 of the wagon transport handle 136 (of FIG. 1) are pivotally connected to the top cover 144 of the handle mount 138. A complementary fastener (e.g., a threaded nut) 168 is mated to the coupling connector 166 to hold the connector in place and establish an axle around which the handle bars 139 and 140 can rotate.

As is best shown in FIG. 10, a first top cover hole 170 is formed through the top cover 144 of the handle mount 138 in the space between the first and second raised fingers 148 and 149 and a second top cover hole 171 is formed through the top cover 144 in the space between the second and third raised fingers 149 and 150. A pair of bottom cover holes 172 and 173 are formed through the bottom cover 146 of the handle mount 138. A pair of handle mounting holes 174 and 175 are formed through the front extension 34 of the wagon frame 2 between the pair of side braces 158 and 160 that lie in surrounding engagement with extension 34. With the top cover holes 170 and 171 that run through the top cover 144 axially aligned with the bottom cover holes 172 and 173 that run through the bottom cover 146 and the handle mounting holes 174 and 175 that run through the front extension 34, a pair of handle mount connectors (e.g., bolts) 176 and 177 are pushed through respective ones of the series of axially aligned holes (best shown in FIG. 11), whereby the top and bottom covers 144 and 146 of the handle mount 138 are connected together one above the other in surrounding engagement with the front extension 34 of the wagon frame 2.

With the handle mount 138 of the wagon 1 in its assembled configuration as shown in FIG. 8, the pair of handle bars 139 and 140 of the wagon transport handle 136 are rotatable around the coupling connector bolt 166. By virtue of the handle mount 138 herein described, the handle bars 139 and 140 can be rotated through an angle of greater than 180 degrees from a location outside the wagon basket 3 at which a pulling or a pushing force is applied to the grip 142 to an out of the way location inside the wagon basket 3 when the wagon is not in use. When the handle bars 139 and 140 are rotated to their out of the way location inside the basket 3, the handle 136 will be relocated so as to avoid being accidentally tripped over by unsuspecting individuals.

The invention claimed is:
1. A wagon having a front and a back and comprising:
a basket in which to transport a first article and/or a small child;

a basket support rack lying below said basket on which said basket is seated, said basket support rack having a top, a bottom, and first and opposite sides;
a frame to which said basket is attached to hold said basket up above said basket support rack;
wheels connected to said frame by which to enable said wagon to be moved from place-to-place; and
a carriage connected to said wagon below said basket and underneath said basket support rack by which to transport a second article, said carriage having a pair of C-shaped bracket arms that are attached to and depend vertically downward from each of the first and opposite sides of said basket support rack, and each pair of said C-shaped bracket arms being located underneath said basket support rack in spaced facing alignment with one another so as to carry the second article therebetween.

2. The wagon recited in claim 1, wherein said pairs of vertically downward depending C-shaped bracket arms of each of the first and second brackets of said carriage are pivotally coupled to respective ones of the first and opposite sides of said basket support rack so as to be rotatable upwardly to a horizontal position lying adjacent the bottom of said basket support rack.

3. The wagon recited in claim 1, wherein each of the pairs of C-shaped bracket arms that depend vertically downward from respective ones of the first and opposite sides of said basket support rack are slidable towards and away from one another along said first and opposite sides.

4. The wagon recited in claim 1, further comprising a wagon transport handle pivotally coupled to said frame at the front of the wagon to which a pulling or a pushing force is applied to cause the wagon to roll on said wheels from place-to-place, said wagon transport handle being rotatable relative to said basket through an angle of greater than 180 degrees from a first position located outside said basket to a second position located inside said basket.

5. The wagon recited in claim 4, further comprising a handle mount connected to said frame at the front of the wagon, said wagon mount having first and second fingers spaced from one another, and said wagon transport handle having at least one handle bar located between the first and second fingers of said handle mount and pivotally coupled to said handle mount by means of a coupling connector that runs through each of the first and second fingers of said wagon mount and said at least one handle bar located therebetween.

6. The wagon recited in claim 1, wherein said wheels include at least a pair of front wheels, each of said pair of front wheels being connected to said frame at the front of the wagon by means of a front wheel bracket to which a respective one of said pair of front wheels is connected and a wheel shaft housing connected between said front wheel bracket and said frame, said wheel shaft housing having a rotatable shaft extending longitudinally therethrough and connected to said front wheel bracket so that said rotatable shaft, said front wheel bracket, and the one of said pair of front wheels connected to said front wheel bracket are rotatable with one another.

7. The wagon recited in claim 6, further comprising a wheel support brace surrounding said frame at the front of the wagon and being connected to said wheel shaft housing to prevent said front wheel bracket to which said wheel shaft housing is connected from moving in a linear direction with respect to said frame.

8. A wagon having a front and a back and comprising:
a basket in which to transport a first article and/or a small child;
a basket support rack lying below said basket on which said basket is seated, said basket support rack having a front, a rear, and a first and opposite sides;
a frame to which said basket is attached to hold said basket up above said basket support rack;
wheels connected to said frame by which to enable said wagon to be moved from place-to-place; and
a carriage connected to the back of said wagon behind said basket by which to transport a second article, said carriage including a platform and first and second attachment hooks extending from said platform to be hooked onto and attached to said wagon at the rear of said basket support rack so that said platform extends rearwardly from said basket support rack, said first and second attachment hooks being unhooked from the rear of said basket support rack by which said platform is detached from said wagon.

9. The wagon recited in claim 8, wherein the wheels of said wagon include first and second rear wheels, and the frame of said wagon includes a rear wheel support track located at the back of said wagon behind said basket thereof to which said first and second rear wheels are connected, said platform having a platform spacing bar extending laterally thereacross and being positioned so as to lay on said rear wheel support track by which to hold said platform up above the rear wheels.

10. The wagon recited in claim 9, wherein said platform is detachable from the rear of said basket support rack when the first and second attachment hooks that extend from said platform are unhooked from said first and second platform retainer clips.

11. The wagon recited in claim 8, further comprising first and second platform retainer clips connected to the rear of said basket support rack, the first and second attachment hooks which extend from said platform being hooked to respective ones of said first and second platform retainer clips by which said platform is detachably connected to said wagon at the rear of said basket support rack.

12. The wagon recited in claim 8, further comprising a wagon transport handle pivotally coupled to said frame at the front of the wagon to which a pulling or a pushing force is applied to cause the wagon to roll on said wheels from place-to-place, said wagon transport handle being rotatable relative to said basket through an angle of greater than 180 degrees from a first position located outside said basket to a second position located inside said basket.

13. The wagon recited in claim 12, further comprising a handle mount connected to said frame at the front of the wagon, said wagon mount having first and second fingers spaced from one another, and said wagon transport handle having at least one handle bar located between the first and second fingers of said handle mount and pivotally coupled to said handle mount by means of a coupling connector that runs through each of the first and second fingers of said wagon mount and said at least one handle bar located therebetween.

14. The wagon recited in claim 8, wherein said wheels include at least a pair of front wheels, each of said pair of front wheels being connected to said frame at the front of the wagon by means of a front wheel bracket to which a respective one of said pair of front wheels is connected and a wheel shaft housing connected between said front wheel bracket and said frame, said wheel shaft housing having a rotatable shaft extending longitudinally therethrough and connected to said front wheel bracket so that said rotatable shaft, said front wheel bracket, and the one of said pair of front wheels connected to said front wheel bracket are rotatable with one another.

15. The wagon recited in claim 14, further comprising a wheel support brace surrounding said frame at the front of the wagon and being connected to said wheel shaft housing to prevent said front wheel bracket to which said wheel shaft housing is connected from moving in a linear direction with respect to said frame.

16. A wagon having a front and a back and comprising:
- a basket in which to transport a first article and/or a small child;
- a basket support rack lying below said basket on which said basket is seated, said basket support rack having a top, a bottom, and first and opposite sides;
- a frame to which said basket is attached to hold said basket up above said basket support rack;
- wheels connected to said frame by which to enable said wagon to be moved from place-to-place; and
- a carriage connected to said wagon below said basket and underneath the bottom of said basket support rack, said carriage having a pair of C-shaped arms pivotally connected to said basket support rack at each of the first and opposite sides thereof, each pair of said C-shaped arms depending vertically downward from said basket support rack so as to lie in spaced facing alignment with one another to transport a second article therebetween, and being rotatable upwardly to a horizontal position lying adjacent the bottom of said basket support rack, and
- each pair of said vertically depending C-shaped arms moving back and forth and towards and away from one another to correspondingly adjust the distance therebetween.

17. The wagon recited in claim 16, where each pair of said vertically depending C-shaped arms is slidable along said basket support rack so as to move back and forth and towards and away from one another.

\* \* \* \* \*